J. C. BOYD.
SAFETY CAR BRAKE APPARATUS.
APPLICATION FILED MAR. 31, 1913.

1,084,391.

Patented Jan. 13, 1914.

2 SHEETS—SHEET 1.

WITNESSES
J. Herbert Bradley
Ella McConnell

INVENTOR
James C. Boyd

J. C. BOYD.
SAFETY CAR BRAKE APPARATUS.
APPLICATION FILED MAR. 31, 1913.
1,084,391.
Patented Jan. 13, 1914.
2 SHEETS—SHEET 2.
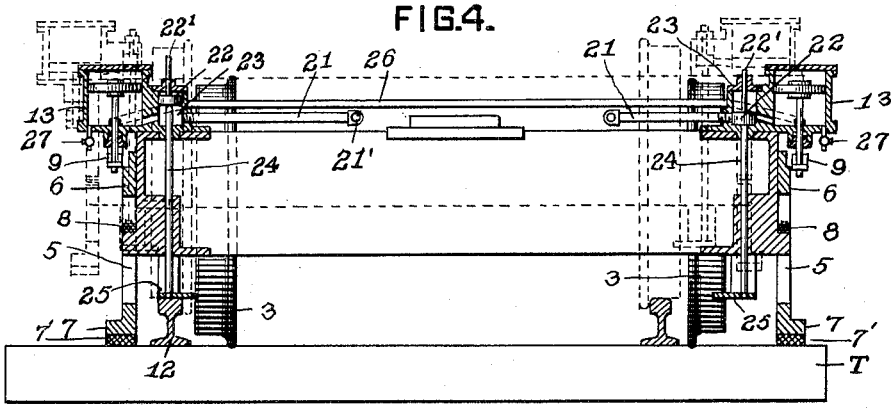
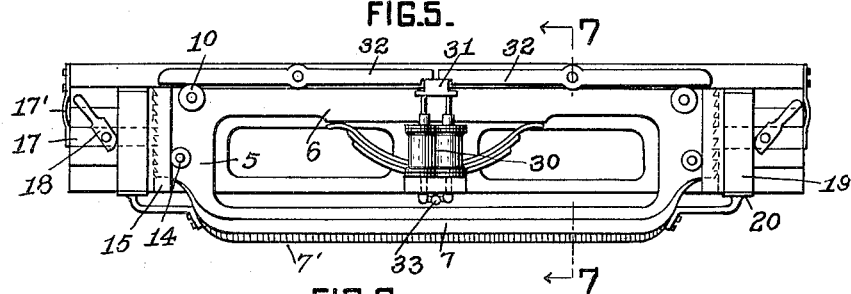
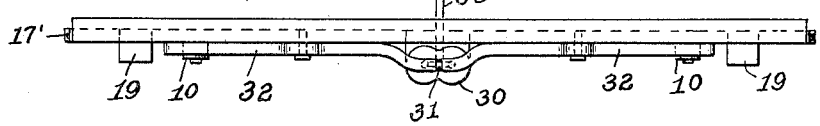
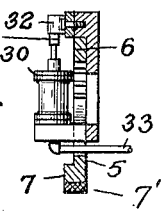
WITNESSES
J. Herbert Bradley.
Ella McConnell
INVENTOR
James C. Boyd

UNITED STATES PATENT OFFICE.

JAMES C. BOYD, OF PITCAIRN, PENNSYLVANIA.

SAFETY CAR-BRAKE APPARATUS.

1,084,391. Specification of Letters Patent. Patented Jan. 13, 1914.

Application filed March 31, 1913. Serial No. 757,763.

*To all whom it may concern:*

Be it known that I, JAMES C. BOYD, a citizen of the United States, and resident of Pitcairn, in the county of Allegheny and State of Pennsylvania, have invented certain new and useful Improvements in Safety Car-Brake Apparatus, of which the following is a specification.

The object of this invention is to provide brake means for stopping a railway car immediately upon being derailed, the derailment operating to cause the lowering of elongated brake beams or shoes which engage the road bed or pavement thereby checking the movement of the car on its wheels and bringing it to a standstill. While the brake mechanism is preferably caused to be tripped automatically when the car is derailed, it may be operated at will by the motorman or engine driver, such an adaptation of the invention being herein shown and described.

Figure 1:
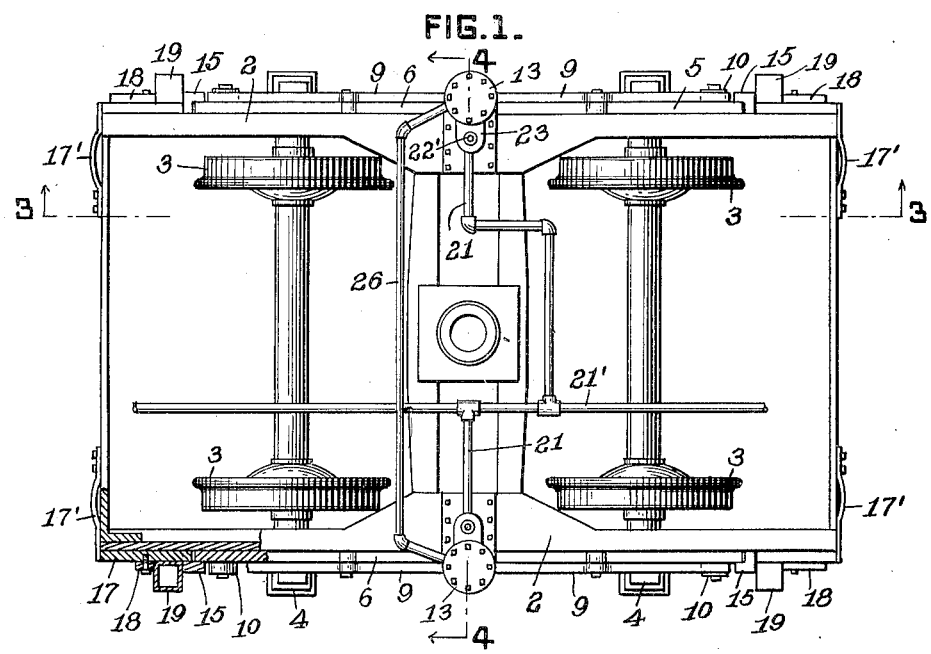
Figure 2:
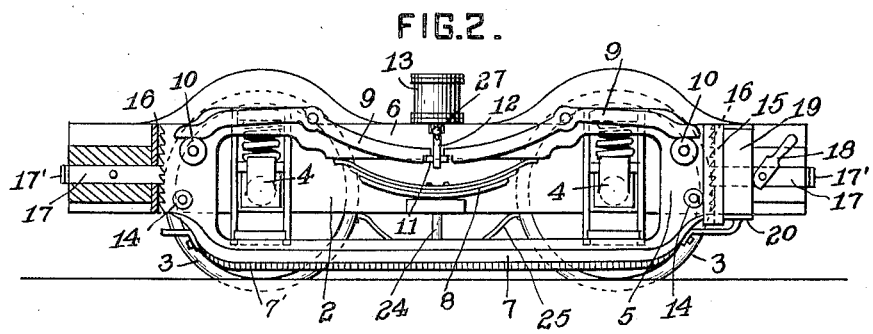
Figure 3:
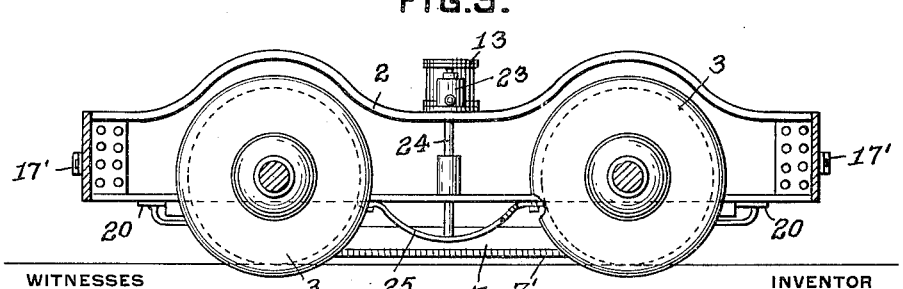

In the accompanying drawings, Figure 1 is a view in top plan of a car truck equipped with the invention, and Fig. 2 is a side elevation of the same. Fig. 3 is a sectional elevation taken on line 3—3 of Fig. 1. Fig. 4 is a vertical cross section of the truck taken on line 4—4 of Fig. 1, the truck being shown in dotted lines in position on the track with the brake mechanism raised or in normal position, while in solid lines the truck is off the track and the brake bars are in lowered or track engaging position. Fig. 5 is a side elevation of the truck frame showing a modified arrangement of power cylinders, and Fig. 6 is a top plan of the same. Fig. 7 is a cross section taken on line 7—7 of Fig. 5.

Referring to the drawings, and particularly to the adaptation shown in Figs. 1 to 4, 2 designates the opposite side members of the truck frame, 3 are the wheels, and 4 the axle boxes. Movable vertically on the outer face of each truck side 2 is a beam 5 of considerable vertical width or depth, the beam being cut away in order to embrace and move vertically relatively to the axle boxes. The lower longitudinal portion of the beam constitutes a runner-like brake shoe 7. Each beam is held normally raised by spring 8 which is carried by the truck and which engages the under face of the longitudinal bar-like portion 6 of beam 5. For depressing each brake beam 5, levers 9 are fulcrumed to truck side 2 with the outer ends of the levers adapted to bear on rollers 10 secured to the beam and with the inner extremities of the levers arranged adjacent to each other and adapted to be engaged by pin 11 carried by piston rod 12 of cylinder 13. When air or other fluid under pressure is admitted to cylinder 13 the piston therein is raised, as in full lines in Fig. 4, and levers 9 so operate as to depress the brake beam, antifriction rollers 14 on the beam engaging the edges of guideways 15 in which the beam slides. The end edges of the beam are formed with ratchet teeth 16 which are adapted to be engaged by horizontally sliding dogs 17 held normally projected inwardly by spring 17', so that while the beam may move downward freely it is positively held in its lowermost position and cannot recede until dogs 17 are released. Each of the latter may be retracted by an eccentric 18 pivoted to the dog and adapted to bear against sand box 19 fixed to the truck frame. A closure 20 for the bottom of each sand box is carried by beam 5 so that as the latter moves downward to braking position the box is opened and sand is discharged therefrom in the path of the brake shoe 7. With a sand box at either end of the brake beam the sand is available regardless of the direction in which the truck may be running at the time the emergency apparatus is brought into play. Air or other fluid under pressure is communicated to the opposite cylinders through pipes 21, the latter connected to a supply pipe 21' that may lead from any fluid pressure source. Admission of fluid from pipes 21 to each cylinder is controlled by piston valve 22 working in a valve casing 23, the latter communicating with the lower end of the cylinder. Pistons 22 are normally in lowered position, closing communication with the cylinders. Each valve is adapted to be raised by a rod 24 which is connected to the depending trip spring 25 arranged adjacent to wheels 3, so that as soon as the truck is derailed one or the other of the trips will be brought into engagement with one of the rails, as in full lines in Fig. 4, thereby elevating the valve connected thereto and admitting fluid to the bottom of its cylinder. The lower ends of the cylinders are cross-connected by a pipe 26, so that air or other fluid admitted to one cylinder is immediately communicated to the other cylinder whereby the pistons of both cylinders are raised simultaneously with the resulting simultaneous lowering of the brake beams at opposite sides of the truck into contact with the cross ties T, as in full lines in Fig. 4. The under faces of the brake shoes may be roughened or surfaced at 7' in such way as to retard sliding, and sliding is further retarded by the sand applied as described. The result is that the weight of the truck is thrown on the brake beams and instead of the wheels bumping along on the cross ties the car is quickly brought to a standstill. The emergency brake mechanism operates so quickly after the wheels leave the rails that they cannot proceed far before being stopped, in fact before there is opportunity for them to leave the road bed. For readjusting the mechanism the air is exhausted from the cylinders through pet cocks 27, and by retracting dogs 17 with eccentrics 18 the brake beams are returned to raised position by springs 8. Stem 22' of valve 22 preferably fits sufficiently tight in top of valve casing 23 to be frictionally held in raised position after being pushed upward by trip 25 and rod 24 so that the valve will remain open even if the trip is moved out of engagement with the rail.

In the adaptation shown in Figs. 5, 6 and 7, which is designed more especially for traction and other service where the rails are substantially flush with the pavement or road bed, the cylinders 30 are preferably arranged at the outer sides of the truck instead of on top thereof, as in the first described construction, and so are out of the way of the car body which in the case of a four-wheel street car is usually superimposed directly upon the truck mechanism. Two cylinders 30 are utilized at each side in order that cylinders of sufficiently small size may be used as not to protrude too far. The piston rods of these cylinders are connected to a head 31 which bears upwardly on the adjacent ends of levers 32 which correspond to levers 9 of the construction first described. In this adaptation, also, it is designed to have the operation under the control of the motorman, air being admitted directly to the cylinders from a pipe 33 when the motorman opens a valve, not shown, controlling such pipe. When an emergency arises the motorman may instantly apply the pavement or road-bed-brakes and bring the car to a standstill, this even though the wheels may not have left the tracks. The lowering of the brake beams may cause sand to be discharged in advance thereof as in the arrangement first described.

It is characteristic of the invention that the runner-like brake devices are located out of vertical alinement with the track rails, their positions, respectively, being outwardly from the latter, so that they not only engage the road bed at the outer sides of the rails instead of engaging the rails, but also serve as guards for preventing the truck from leaving the road bed. With the guards at the outer sides of the rails, one guard or the other is adapted to engage the track rails and prevent the truck from moving sidewise far enough to leave the road bed, in the event of derailment one of the rails being always located between the wheels and one of the brake devices, as shown at the lefthand side of Fig. 4. Also, the brake devices are substantially coextensive in length with the length of the wheel tread of the truck, as shown in Fig. 2, and with the braking effect thus coextensive with the tread the action is far more efficient than could be obtained from brake shoes or brake devices of less area located between the wheels or inwardly from the ends of the wheel tread.

It will be understood that road bed engaging devices of any desired construction may be employed, the invention not being restricted to the runner-like shoes or bars herein shown.

I claim:—

1. The combination of a car truck provided with vertical guideways at opposite sides thereof with the length of each guideway substantially coextensive with the length of the wheel tread, a horizontally elongated brake device fitting and slidable vertically in each guideway, and means for operating said brake devices.

2. The combination of a car truck provided with a horizontally elongated vertical guideway extending longitudinally of the direction of travel of the truck, a horizontally elongated brake device slidable vertically in the guideway, means for depressing the brake device, and pawl and ratchet connections between the brake device and the car truck for holding said device against upward movement but without retarding its downward movement.

3. The combination of a car truck provided with a horizontally elongated vertical guideway extending longitudinally of the direction of travel of the truck, a horizontally elongated brake device slidable vertically in the guideway, means for depressing the brake device, and pawl and ratchet connections between opposite ends of the brake device and corresponding ends of the guideway for holding said device against upward movement but without retarding its downward movement.

4. The combination of a car truck provided with a horizontally elongated vertical guideway extending longitudinally of the direction of travel of the truck, a horizontally elongated brake device movable vertically in the guideway, a spring interposed between the truck and brake device for opposing downward movement of the latter, pawl and ratchet connections between the brake device and truck for holding the device against upward movement as the latter is lowered but without interfering with the lowering movement thereof, and means for depressing the brake device.

5. The combination of a car truck, a brake device movable vertically thereon, fluid pressure means for lowering said device, a valve for controlling the fluid pressure means, a downwardly bowed upwardly pressible spring secured to the truck in position to engage a track rail when the truck is derailed, and an operative connection between said spring and valve.

6. The combination of a car truck, brake devices extending longitudinally of the truck and slidable vertically thereon, a pair of levers for each brake device with the levers fulcrumed between their ends to the truck inwardly from the ends of the brake devices and with the outer ends of the levers engaging the latter, and actuating means operatively connected to the inner ends of the levers.

7. The combination of a car truck, brake devices extending longitudinally of the truck and slidable vertically thereon, vertical guideways on the truck in which the brake devices slide, the brake devices formed with vertical series of ratchet teeth, dogs movably mounted on the truck for engaging the ratchet teeth, and means for depressing the brake devices.

8. The combination of a car truck, brake devices movable vertically thereon, fluid pressure means for actuating the brake devices, valves for the fluid pressure means, upwardly pressible shoes carried by the truck and adapted to engage the rails when the truck is derailed, and operative connections between said shoes and valves.

9. The combination of a car truck, brake devices extending longitudinally of the truck at opposite sides thereof and movable vertically thereon, power cylinders operatively connected to the brake devices, a trip device for each cylinder for admitting fluid under pressure thereto, and means for passing fluid from either cylinder to the other whereby the cylinders are adapted to depress the beams simultaneously.

10. The combination of a car truck, brake devices extending longitudinally thereof and movable vertically, springs for holding the brake devices normally elevated, power cylinders operatively connected to the brake devices for depressing them, a fluid connection between the cylinders, two trip devices for the cylinders—one for each track rail with one or the other of the trip devices adapted to engage a rail and be moved vertically thereby when the truck becomes derailed, a fluid supply pipe, and a valve which is actuated by the elevated trip to admit fluid to its cylinder.

In testimony whereof I affix my signature in presence of two witnesses.

JAMES C. BOYD.

Witnesses:
J. M. NESBIT,
ELLA M. CONNELL.

---

Copies of this patent may be obtained for five cents each, by addressing the "Commissioner of Patents, Washington, D. C."